(12) United States Patent
Niklas et al.

(10) Patent No.: US 8,388,286 B2
(45) Date of Patent: Mar. 5, 2013

(54) TIE-DOWN EYE

(75) Inventors: Joerg Niklas, Finnentrop (DE); Oliver Bongen, Finnentrop (DE)

(73) Assignee: Gebr. Kemmerich GmbH, Attendorn (DE)

( * ) Notice: Subject to any disclaimer, the term of this patent is extended or adjusted under 35 U.S.C. 154(b) by 0 days.

(21) Appl. No.: 13/343,542

(22) Filed: Jan. 17, 2012

(65) Prior Publication Data
US 2012/0174344 A1 Jul. 12, 2012

(30) Foreign Application Priority Data
Jan. 7, 2011 (DE) .................. 20 2011 001 237 U

(51) Int. Cl.
*B60P 7/08* (2006.01)
(52) U.S. Cl. ......... 410/111; 410/106; 410/107; 410/112
(58) Field of Classification Search .................. 410/106, 410/107, 109, 110, 111, 112, 116; 24/115 K, 24/265 CD; 248/499
See application file for complete search history.

(56) References Cited

U.S. PATENT DOCUMENTS
5,788,437 A * 8/1998 Kalis, Jr. ..................... 410/107

* cited by examiner

*Primary Examiner* — Stephen Gordon
(74) *Attorney, Agent, or Firm* — Andrew Wilford

(57) ABSTRACT

A tie-down eye for a cargo space of a motor vehicle has an annular loop pivoted on a mount that is formed with a journal part wrapped around a portion of the loop, and the mount and the loop are secured in a frame element fixed in a floor of the cargo space. The loop, which serves for attachment of securing straps, retaining ropes, retaining nets, or similar load-securing elements on or against the cargo surface can pivot between a nonuse position recessed in the frame element and use position projecting upward therefrom. The mount is formed with a cutout in its journal part wrapped around the loop, and a projection extending radially from the loop extends through this cutout and bears against an inner peripheral edge of the cutout when in the use position.

8 Claims, 2 Drawing Sheets

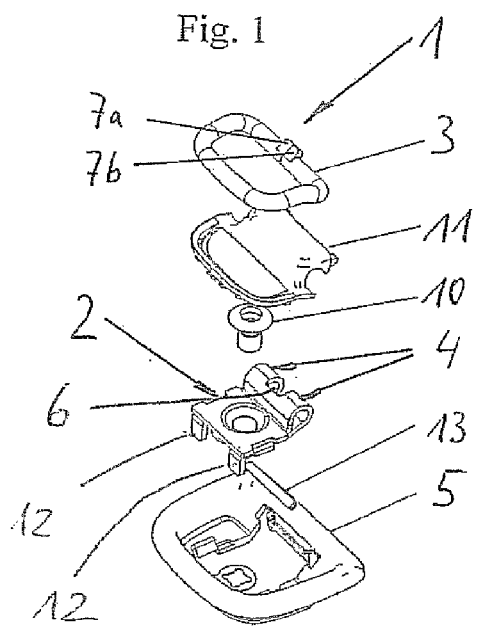
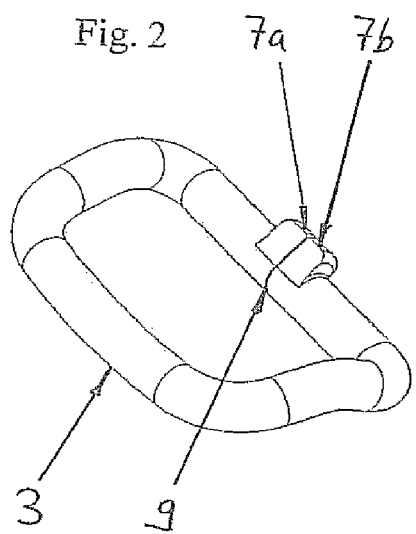
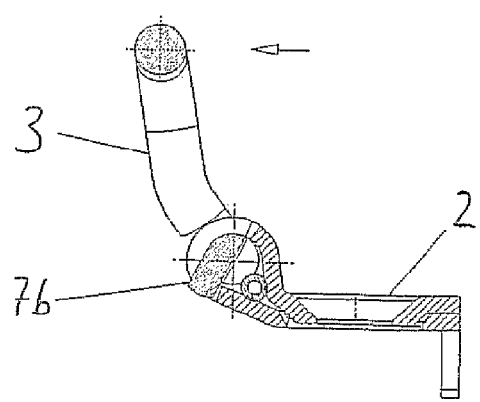
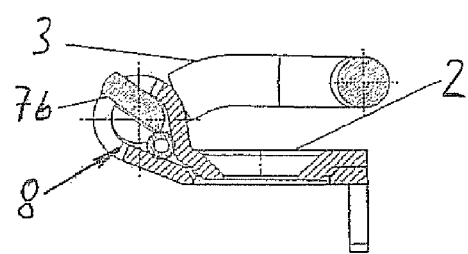

TIE-DOWN EYE

The invention relates to a tie-down eye for a cargo space of a motor vehicle, comprising a mount and an annular loop that can pivot in the mount from a nonuse position to a use position, the mount having a journal part wrapped around a portion of the loop, the mount and the loop preferably being carried on and attached to a frame element in a floor of the cargo space, the loop functioning for attaching securing straps, retaining ropes, retaining nets, or similar load-securing elements on or against the cargo surface.

Tie-down eyes of this type are well-known in the prior art. They function to fasten in a transport-safe manner such items as, for example, luggage that are carried in the cargo space of the motor vehicle. In order to use a tie-down eye of this type, the loop, which extends approximately parallel to the cargo-space floor when in the nonuse position, is pivoted, for example, to an approximately upright use position. A securing rope, securing strap, or similar securing means can now be passed through the eyelet-like loop, and the luggage or other items can now be secured in place therewith to the loop.

While solutions of this type have proven successful per se, what is nevertheless disadvantageous is the fact that an excessive pivoting of the loop can be effected beyond the use position due to the excessively high application of force when the luggage is secured in place or when the loop is manipulated. As this occurs, the loop can damage the frame element, and possibly sections of the motor vehicle's cargo-space liner.

Based on the above-described prior art, the object of this invention is to create a tie-down eye of the above-described type in which excessive pivoting of the loop beyond the use position is effectively prevented, and damage caused thereby is effectively prevented by the journal part of the tie-down eye or the cargo-space liner, which tie-down eye at the same time can be produced inexpensively and easily, and has a long service life.

In order to attain this object, the invention proposes an approach whereby the mount is formed with a cutout in its journal part wrapped around the loop, in which cutout a projection extending radially from the loop is provided or formed, wherein the projection bears against an inner peripheral edge of the cutout when in the use position.

This type of solution according to the invention enables the loop to be pivoted on the mount in the manner known per se. Once it has reached the pivoted-up use position, the projection(s) formed on the loop rest or bear on an inner peripheral edge of the cutout in such a way as to prevent any further pivoting beyond the use position. As a result, this type of loop according to the invention cannot be pivoted beyond the use position and sustain damage itself, and/or cannot damage other parts of the tie-down eye such as the frame element or parts of the cargo-space liner.

The annular shape of the loop has a straight section at least in the journal part surrounded by the mount, while in one embodiment the loop also includes a second slightly shorter straight section in a journal part opposite the wrapped journal part. A loop shaped in this way can be quickly and easily pivoted from an approximately horizontal nonuse position to an approximately vertical use position by reaching through with a finger, then in the approximately vertical use position subsequently fastening, and optionally securing, an appropriate securing means, such as, for example, a securing strap, retaining rope, or retaining net to the loop.

Provision can especially preferably be made here whereby the loop is formed by a wire bent into a ring, where the abutment face of this wire is engaged in the journal part of the cutout, the projection being engaged in the cutout at one of the ends of the wire on or near the abutment face.

In particular, provision can especially preferably be made whereby the loop is formed by a wire bent into a ring, where the abutment face of this wire is engaged in the journal part of the cutout, a projection being engaged in the cutout at each end of the wire on or near the abutment face.

The arrangement of the projection or projections, on or near the abutment face allows for an especially high application of force by the loop, while preventing the ends of the loop from bending upward when a securing strap, retaining rope, or the like is secured in place.

In addition, provision can especially preferably be made whereby the width of the cutout is slightly greater than the width of the projections(s).

This ensures that ends of the loop wire that are also not fastened to each other bend apart even in response to forces being exerted axially on the wrapped journal part since the projections contact or abut the lateral peripheral edges of the cutout in response to such forces, thereby preventing any further bending up in the direction running axially relative to the wrapped journal part.

This allows an expensive joining of the free ends of the wire, typically effected by welding, to be eliminated, with the result that this type of tie-down eye according to the invention is both inexpensive to produce and is also able to accommodate high forces of tension.

In addition, provision can especially preferably be made whereby the frame element surrounds the mount underneath and on the sides such that the mount and the frame element are coplanar in the nonuse position, where the mount and the frame element are attached to the cargo-space floor, for example, by attachment screws, while the mount is covered by a decorative cap when closed.

This type of frame element can be used to insert the entire tie-down eye into the cargo-space floor of the motor vehicle and lie flush with the floor. This enables even relatively large pieces of luggage, for example, to be slid over the tie-down eye or deposited thereon without being resisted by the tie-down eye.

In addition, provision can especially preferably be made whereby anti-twist elements are provided on the mount in the form of retaining projections provided on the journal part opposite the loop, which projections engage corresponding cutouts on the cargo-space floor.

This ensures that the entire tie-down eye cannot twist relative to the attachment journal part, in journal particular, relative to the cargo-space floor. The retaining projections enable the tie-down eye to be fastened to the cargo-space floor by a single screw or similar fastener, such as, for example, a rivet, since the retaining projections secure the tie-down eye so as to preclude twisting.

In addition, provision can especially preferably be made whereby an elastic element is provided on the mount in the journal part wrapped around the loop.

Finally, provision can especially preferably be made whereby the elastic element is composed of a plastic hose segment whose length matches the length of the wrapped journal part and is surrounded by the mount around the loop.

Providing a plastic hose segment of this type as the elastic element functions both as a noise-attenuating means and also as tolerance compensation for the loop in the journal part of the mount wrapped around the loop. This enables the loop to be manipulated virtually noiselessly on the mount while preventing rattling.

An embodiment of the invention is illustrated in the drawings and is described in more detail below. Therein:

FIG. 1 is an exploded view of a tie-down eye according to the invention;

FIG. 2 is an enlarged view of the loop of FIG. 1;

FIG. 3 is a section through a mount according to the invention with loop in the use position;

FIG. 4 is a view similar to FIG. 3 in the nonuse position;

Figure 5:
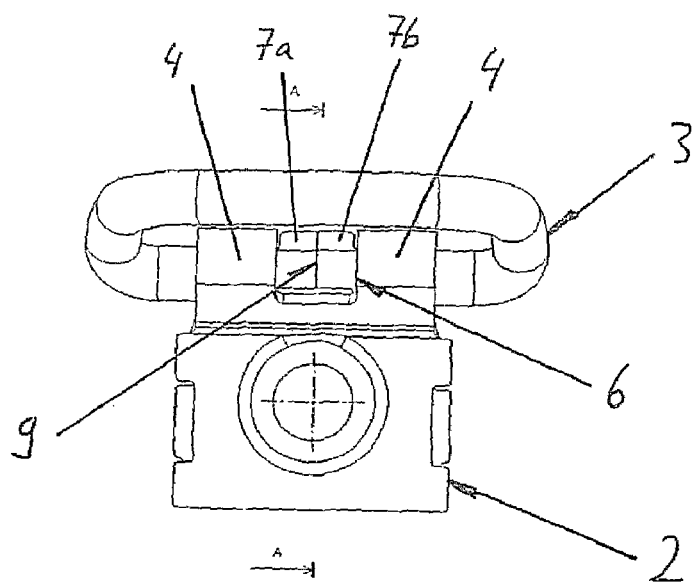
FIG. 5 is a top view of a mount according to the invention with loop in the use position.
Figure 6:
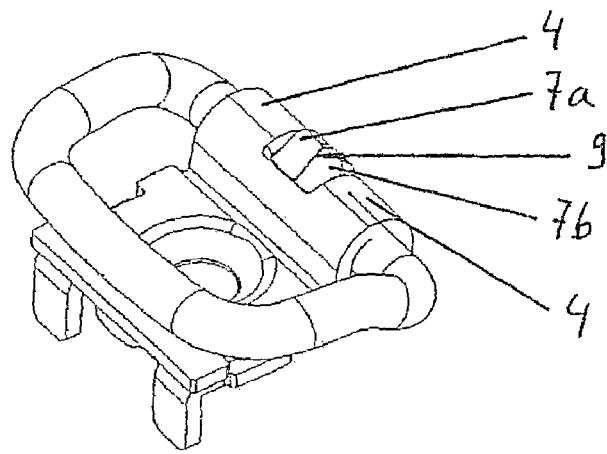
FIG. 6 is a view similar to FIG. 5 as seen at an angle from above.
Figure 7:
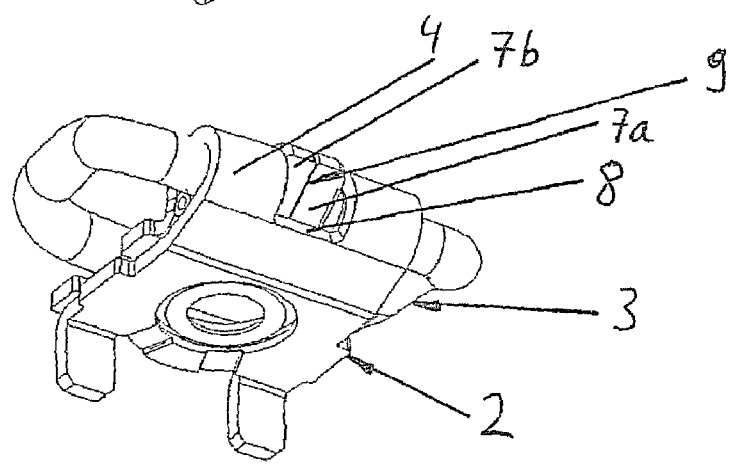
FIG. 7 is a view similar to FIG. 6 as seen obliquely from below.

The figures show a tie-down eye 1 for a cargo space of a motor vehicle. This is comprised in the illustrated embodiment of a mount 2 made of sheet steel and a loop 3, also made of steel and able to pivot in the mount 2 from a nonuse position to a use position. The mount 2 includes a journal part 4 that surrounds the loop 3. When in the intended assembled position, the mount 2 and the loop 3 are provided and attached in the floor of the cargo space of a motor vehicle on a frame element 5. The loop 3 functions for attachment of place securing straps, retaining ropes, retaining nets, or similar load-securing elements on or against the cargo surface of the cargo space of the motor vehicle.

According to the invention, the mount 2 is formed with a the cutout 6 in its journal part 4 that surrounds the loop 3. A projection 7a, 7b that extends radially from the loop 3 is engaged in the cutout 6. Alternatively and as illustrated in the figures, two adjacent projections 7a and 7b can also be provided. Each projection 7a and 7b here bears on an inner peripheral edge 8 of the cutout 6 when in the use position so as to prevent pivoting of the loop 3 beyond the use position, and thus prevent damage caused thereby to the frame element 5 or journal of the cargo-space floor liner.

The loop 3 is composed here of a wire bent into an annulus formed with an abutment face 9 engaged in the journal part of the cutout 6. One of the projections 7a or 7b is engaged here in the cutout 6 at each end of the wire near or on the abutment face 9. The projections 7a and 7b pivot together with the loop 3 when the loop 3 is pivoted from the nonuse position to the use position. Once the use position is reached, the projections 7a and 7b contact inner peripheral edge 8 of the cutout 6, which thus constitutes a travel-limiter for pivoting of the loop 3 and prevents the loop 3 from pivoting beyond the use position.

Alternatively, but not shown in the figures, a projection 7a or 7b can also be provided on only one end of the wire on or near the abutment face.

The annular shape of the loop 3 includes a first straight section that is surrounded by the mount 2 (at 4). In addition, the mount 3 includes a second part that is approximately parallel to the first straight journal part.

As viewed in the axial direction of the first straight section, the length of the cutout 6 is slightly greater that the length of the projections 7a and 7b. As a result, integral bonding, for example, of the two ends—which would entail additional costs—is no longer required since the projections are engaged in the cutout when forces are applied to the loop 3 axially relative to the first straight section, and prevent the ends of the wire loop from bending up since they contact or abut the lateral peripheral edges of the cutout 6 that define the length of the cutout 6.

As is especially clearly shown in FIG. 1, the frame element 5 surrounds the mount 2 underneath and externally in such a way that the mount 2 and the frame element are coplanar when in the nonuse position. The mount 2 and the frame element 5 are screwed here to the cargo-space floor (at 10) in the embodiment. When the tie-down eye 1 is closed, a decorative cap 11 covering the mount 2 and the screw 10 is provided on the tie-down eye 1 so as to visually hide this attachment screw 10. The mount 2 is composed here of a plate, and a part extending on the side from the plate that surrounds the loop 3.

An elastic element in the form of a plastic hose segment 13 is provided on the mount 2 in the journal part 4 that surrounds the loop 3 in order to provide tolerance compensation and to prevent any possible generation of noise, such as, for example, rattling. In the embodiment, the length of plastic hose segment 13 matches the perimeter of the journal part 4 of the loop 3 and is surrounded by the mount together with the loop 3.

The invention is not limited to the illustrated embodiment but can be varied in numerous ways within the scope of the disclosure.

All features, whether individually or in combination with each other, that are disclosed as novel in the description and/or the drawing must be considered essential to the invention.

The invention claimed is:

1. A tie-down eye for a cargo space of a motor vehicle, the tie-down eye comprising
   a mount and
   an annular loop that can pivot in the mount from a nonuse position to a use position, the mount having a journal part wrapped around a portion of the loop, the mount and the loop being carried on and attached to a frame element in a floor of the cargo space, the loop functioning for attaching securing straps, retaining ropes, retaining nets, or similar load-securing elements on or against a cargo surface, the mount is formed with a cutout in its journal part wrapped around the loop, in which cutout a projection extending radially from the loop is provided or formed, the projection bearing against an inner peripheral edge of the cutout when in the use position.

2. The tie-down eye according to claim 1, wherein the loop is formed by a wire bent into a ring, an abutment face of this wire being engaged into the cutout the projection being engaged in the cutout at one of ends of the wire on or near the abutment face.

3. The tie-down eye according to claim 1, wherein the loop is formed by a wire bent into a ring, an abutment face of this wire being engaged into the cutout, the projection being engaged in the cutout at each of ends of the wire on or near the abutment face.

4. The tie-down eye according to claim 1, wherein a width of the cutout is slightly greater than a width of the projection.

5. The tie-down eye according to claim 1, wherein the frame element surrounds the mount underneath and externally such that the mount and the frame element are coplanar in the nonuse position, the mount and the frame element being attached to the cargo-space floor by attachment or other attachment element, the mount being covered by a decorative cap when closed.

6. The tie-down eye according to claim 1, wherein anti-twist elements are provided on the mount in the form of retaining projections provided on the journal part opposite the loop, which retaining projections engage corresponding cutouts on the cargo-space floor.

7. The tie-down eye according to characterized claim 1, wherein an elastic element is provided on the mount in the journal part wrapped around the loop.

8. The tie-down eye according to claim 7, wherein the elastic element is a plastic hose segment whose length matches a length of the wrapped journal part and that is surrounded by the mount around the loop.

* * * * *